(12) United States Patent
Shibuya

(10) Patent No.: US 6,847,703 B2
(45) Date of Patent: Jan. 25, 2005

(54) PORTABLE COMMUNICATION TERMINAL AND COMMUNICATION SERVICE SYSTEM

(75) Inventor: Atsushi Shibuya, Tokyo (JP)

(73) Assignee: NEC Corporation, Tokyo (JP)

(*) Notice: Subject to any disclaimer, the term of this patent is extended or adjusted under 35 U.S.C. 154(b) by 475 days.

(21) Appl. No.: 09/745,809

(22) Filed: Dec. 26, 2000

(65) Prior Publication Data

US 2001/0005826 A1 Jun. 28, 2001

(30) Foreign Application Priority Data

Dec. 27, 1999 (JP) .......................................... 11-370263

(51) Int. Cl.[7] .............................................. H04M 1/64
(52) U.S. Cl. ................................ 379/88.14; 455/412.1; 455/417; 709/230
(58) Field of Search .......................... 379/67.1, 70, 71, 379/72, 88.12, 88.13, 88.14, 88.15, 88.17, 85, 88.01; 455/412, 413, 414, 417, 555, 415; 340/7.1, 7.54; 709/230

(56) References Cited

U.S. PATENT DOCUMENTS

| | | | | |
|---|---|---|---|---|
| 4,941,167 A | * | 7/1990 | Cannalte et al. ......... | 379/88.26 |
| 6,052,563 A | * | 4/2000 | Macko ....................... | 340/7.1 |
| 6,055,305 A | * | 4/2000 | Norman et al. ......... | 379/211.01 |
| 6,138,036 A | * | 10/2000 | O'Cinneide .................. | 455/557 |
| 6,175,616 B1 | * | 1/2001 | Light et al. ............... | 379/88.14 |
| 6,226,678 B1 | * | 5/2001 | Mattaway et al. .......... | 709/230 |
| 6,256,516 B1 | * | 7/2001 | Wagner et al. .............. | 455/565 |
| 6,298,128 B1 | * | 10/2001 | Ramey et al. ......... | 379/142.01 |
| 6,445,694 B1 | * | 9/2002 | Swartz ....................... | 370/352 |
| 6,463,134 B1 | * | 10/2002 | Okada et al. ............. | 379/93.24 |
| 6,577,859 B1 | * | 6/2003 | Zahavi et al. ............. | 455/412.1 |
| 6,591,115 B1 | * | 7/2003 | Chow et al. ................. | 455/555 |

FOREIGN PATENT DOCUMENTS

| | | |
|---|---|---|
| JP | H5-7222 | 1/1993 |
| JP | 10-190878 | 7/1998 |
| JP | H11-266298 | 9/1999 |

\* cited by examiner

*Primary Examiner*—Fan Tsang
*Assistant Examiner*—Md. Shafiul Alam Elahee
(74) *Attorney, Agent, or Firm*—Sughrue Mion, PLLC

(57) ABSTRACT

In a portable communication terminal having a voice communication control unit for performing voice communication and a data communication control unit for performing data communication, a message storing unit with a message of character data stored therein is provided and when receiving a call signal, the data communication control unit takes out the message of character data stored in the message storing unit to send an electronic mail including the message to the electronic mail address of a calling party.

12 Claims, 5 Drawing Sheets

FIG. 3

PERSONAL INFORMATION

| REGISTERED NAME | PHONE NUMBER | MAIL ADDRESS | TRANSFER DESTINATION ADDRESS | MESSAGE TYPE |
|---|---|---|---|---|
| SHIBUYA | 090-**-** | shibuya@mail | | 1 |
| HARAJUKU | 090-**-** | hara@mail | fwd@mail | 2 |
| ROPPONGI | 090-**-** | akasaka@mail | ○○○○@mail | 3 |
| SHINJUKU | 03-**-** | △△△@mail | ×××@mail | 2 |
| ⋮ | ⋮ | ⋮ | ⋮ | ⋮ |

PORTABLE COMMUNICATION TERMINAL AND COMMUNICATION SERVICE SYSTEM

BACKGROUNDS OF THE INVENTION

1. Field of the Invention

The present invention relates to a portable communication terminal provided with a voice communication function and a data communication function and an automatic answering method by the same portable communication terminal.

2. Description of the Related Art

Recently, widely prevails a portable communication terminal such as a portable telephone and a PHS (Personal Handyphone System). A portable communication terminal is very convenient for a user to communicate at any place, while there are many cases of hesitating about the voice communication using a portable communication terminal at a place crowded with people. When receiving a call, there is the case where it may happen that a user cannot answer the call in the voice communication.

When receiving a voice call under circumstances where voice communication is impossible or difficult, it is difficult for a user having received the call to explain his or her own situation incapable of the voice communication to a sending party. In the current communication service using a portable communication terminal, when a user having received a call cannot perform voice communication, a calling party knows the situation of a called party through voice announcement previously prepared in a base station providing the same service.

In a method of using such prepared announcement, however, since the content of a message to be sent is fixed, a calling party cannot know the detailed situation of a user at a called party. Therefore, the calling party cannot take proper measures even when the proper measures depending on the situation of a user at the called party are possible such as making a call again or waiting for a return from a user at the called party.

More concretely, as the situations where a user at a called party cannot answer a call, there are various cases including a case where a user cannot operate a portable communication terminal because of being far away from it (user absence situation) and a case where a user cannot operate a portable communication terminal or communicate with it because of being at a conference or driving a car (response impossible situation). If a detailed message toward a calling party can be set depending on the situation of a user at a called party, for example, like a message to the effect that a user at a called party will return a call as soon as he or she comes back in the case where there is no knowing when he or she will come back, or a message to the effect that a user at a called party wants a calling party to make a call again at a specified time in the case where the finishing time of a conference is clear and he or she knows the possible time of communication, the calling party can save the troublesome measures.

As mentioned above, according to the communication service system using the conventional portable communication terminal, when a user having received a call cannot perform voice communication, a means for a calling party's knowing the situation of a user at a called party is only a message of the fixed content prepared in advance. Therefore, a calling party cannot take proper measures efficiently.

SUMMARY OF THE INVENTION

In order to solve the above conventional problem, the present invention aims to provide a portable communication terminal capable of informing the other of a user's situation properly by an electronic mail or the like, under the situations where voice communication is difficult for the user of the portable communication terminal, and provide a communication service system using the same portable communication terminal.

According to one aspect of the invention, a portable communication terminal having voice communication control means for performing voice communication and data communication control means for performing data communication, wherein message storing means with a predetermined message stored therein is provided, and the data communication control means sends an electronic mail including the message stored in the message storing means to an electronic mail address of a calling party when answering a call is impossible.

In the preferred construction, the message storing means stores a plurality of messages, and the data communication control means takes out a predetermined message from the plurality of messages and sends the same message to the other party as the electronic mail.

In another preferred construction, the portable communication terminal further comprises personal information storing means for storing phone number of a calling party and an electronic mail address associated with each other is provided, when answering a call is impossible, information stored in the personal information storing means is retrieved by the phone number of a calling party added to arrival information about the call as a key, and when the corresponding phone number of the calling party is detected, an electronic mail including the message stored in the message storing means is sent to the electronic mail address associated with the same phone number as a destination.

In another preferred construction, the portable communication terminal further comprises personal information storing means for storing phone number of a calling party and an electronic mail address associated with each other, wherein the message storing means stores a plurality of messages, the data communication control means takes out a predetermined message from the plurality of messages and sends the same message to the other party as the electronic mail, and when answering a call is impossible, information stored in the personal information storing means is retrieved by the phone number of the calling party added to the arrival information as a key, and when the corresponding phone number of the calling party is detected, an electronic mail including the message stored in the message storing means is sent to the electronic mail address associated with the same phone number as a destination.

In another preferred construction, the portable communication terminal further comprises personal information storing means for storing phone number of a calling party, an electronic mail address and a transfer destination address associated with each other, when answering a call is impossible, information stored in the personal information storing means is retrieved by the phone number of the calling party added to the arrival information as a key, and when the corresponding phone number of the calling party is detected, an electronic mail including the message stored in the message storing means is sent to the electronic mail address or the transfer destination address associated with the same phone number as a destination.

In another preferred construction, the portable communication terminal further comprises personal information storing means for storing phone number of a calling party, an electronic mail address and a transfer destination address associated with each other, wherein the message storing means stores a plurality of messages, the data communication control means takes out a predetermined message from the plurality of messages and sends the same message to the other party as the electronic mail, when answering a call is impossible, information stored in the personal information storing means is retrieved by the phone number of the calling party added to the arrival information as a key, and when the corresponding phone number of the calling party is detected, an electronic mail including the message stored in the message storing means is sent to the electronic mail address or the transfer destination address associated with the same phone number as a destination.

In another preferred construction, the portable communication terminal further comprises personal information storing means for storing phone number of a calling party, an electronic mail address and a transfer destination address associated with each other, when answering a call is impossible, information stored in the personal information storing means is retrieved by the phone number of the calling party added to the arrival information as a key, and when the corresponding phone number of the calling party is detected, an electronic mail including the message stored in the message storing means is sent to at least one of the electronic mail address and the transfer destination address associated with the same phone number as a destination.

In another preferred construction, the portable communication terminal further comprises personal information storing means for storing phone number of a calling party, an electronic mail address and a transfer destination address associated with each other, wherein the message storing means stores a plurality of messages, the data communication control means takes out a predetermined message from the plurality of messages and sends the same message to the other party as the electronic mail, when answering a call is impossible, information stored in the personal information storing means is retrieved by the phone number of the calling party added to the arrival information as a key, and when the corresponding phone number of the calling party is detected, an electronic mail including the message stored in the message storing means is sent to at least one of the electronic mail address and the transfer destination address associated with the same phone number as a destination.

In another preferred construction, the data communication control means sends the arrival information including the phone number of a calling party and arrival time of a call to the transfer destination address of a called party, by an electronic mail, when transfer to the transfer destination address of the called party is being set.

According to another aspect of the invention, an automatic answering method of a portable communication terminal having voice communication control means for performing voice communication and data communication control means for performing data communication, comprising the following step of the data communication control means sending an electronic mail including a predetermined message to an electronic mail address of a calling party when answering a call is impossible.

In the preferred construction, the automatic answering method of a portable communication terminal comprising the following steps of:

storing a plurality of messages; and the data communication control means taking out the predetermined message from the plurality of messages to send the same message to the other party as the electronic mail.

In another preferred construction, the automatic answering method of a portable communication terminal comprising the following steps of:

storing phone number of a calling party and an electronic mail address associated with each other in the personal information storing means;

retrieving information stored in the personal information storing means by the phone number of the calling party added to the arrival information as a key when answering a call is impossible, and sending an electronic mail including a message to the electronic mail address associated with the same phone number as a destination when the corresponding phone number of the calling party is detected.

In another preferred construction, the automatic answering method of a portable communication terminal comprising the following steps of:

storing a plurality of messages;

the data communication control means taking out the predetermined message from the plurality of messages to send the same message to the other party as the electronic mail;

storing phone number of a calling party and an electronic mail address associated with each other in the personal information storing means; and retrieving information stored in the personal information storing means by the phone number of the calling party added to the arrival information as a key when answering a call is impossible, and sending an electronic mail including a message to the electronic mail address associated with the same phone number as a destination when the corresponding phone number of the calling party is detected.

In another preferred construction, the automatic answering method of a portable communication terminal comprising the following steps of:

storing phone number of a calling party, an electronic mail address and a transfer destination address associated with each other in the personal information storing means;

retrieving information stored in the personal information storing means by the phone number of the calling party added to the arrival information as a key when answering a call is impossible, and sending an electronic mail including the message to the electronic mail address or the transfer destination address associated with the same phone number as a destination when the corresponding phone number of the calling party is detected.

In another preferred construction, the automatic answering method of a portable communication terminal comprising the following steps of:

storing a plurality of messages;

the data communication control means taking out the predetermined message from the plurality of messages to send the same message to the other party as the electronic mail;

storing phone number of a calling party, an electronic mail address and a transfer destination address associated with each other in the personal information storing means; and retrieving information stored in the personal information storing means by the phone number of the calling party added to the arrival information as a key when answering a call is impossible, and sending an electronic mail including the message to the electronic mail address or the transfer destination address associated with the same phone number as a destination when the corresponding phone number of the calling party is detected.

In another preferred construction, the automatic answering method of a portable communication terminal as set forth in claim 10, comprising the following steps of:

storing phone number of a calling party, an electronic mail address and a transfer destination address associated with each other in the personal information storing means;

retrieving information stored in the personal information storing means by the phone number of the calling party added to the arrival information as a key when answering a call is impossible, and sending an electronic mail including the message to at least one of the electronic mail address and the transfer destination address associated with the same phone number as a destination when the corresponding phone number of the calling party is detected.

In another preferred construction, the automatic answering method of a portable communication terminal comprising the following steps of:

storing a plurality of messages;

the data communication control means taking out the predetermined message from the plurality of messages to send the same message to the other party as the electronic mail;

storing phone number of a calling party, an electronic mail address and a transfer destination address associated with each other in the personal information storing means; and retrieving information stored in the personal information storing means by the phone number of the calling party added to the arrival information as a key when answering a call is impossible, and sending an electronic mail including the message to at least one of the electronic mail address and the transfer destination address associated with the same phone number as a destination when the corresponding phone number of the calling party is detected.

In another preferred construction, the automatic answering method of a portable communication terminal comprising the following steps of:

the data communication control means sending the arrival information including the phone number of a calling party and arrival time of a call to the transfer destination address of a called party, by an electronic mail, when transfer to the transfer destination address of the called party is being set.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a view showing an example of personal information for use in the form of the embodiment;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
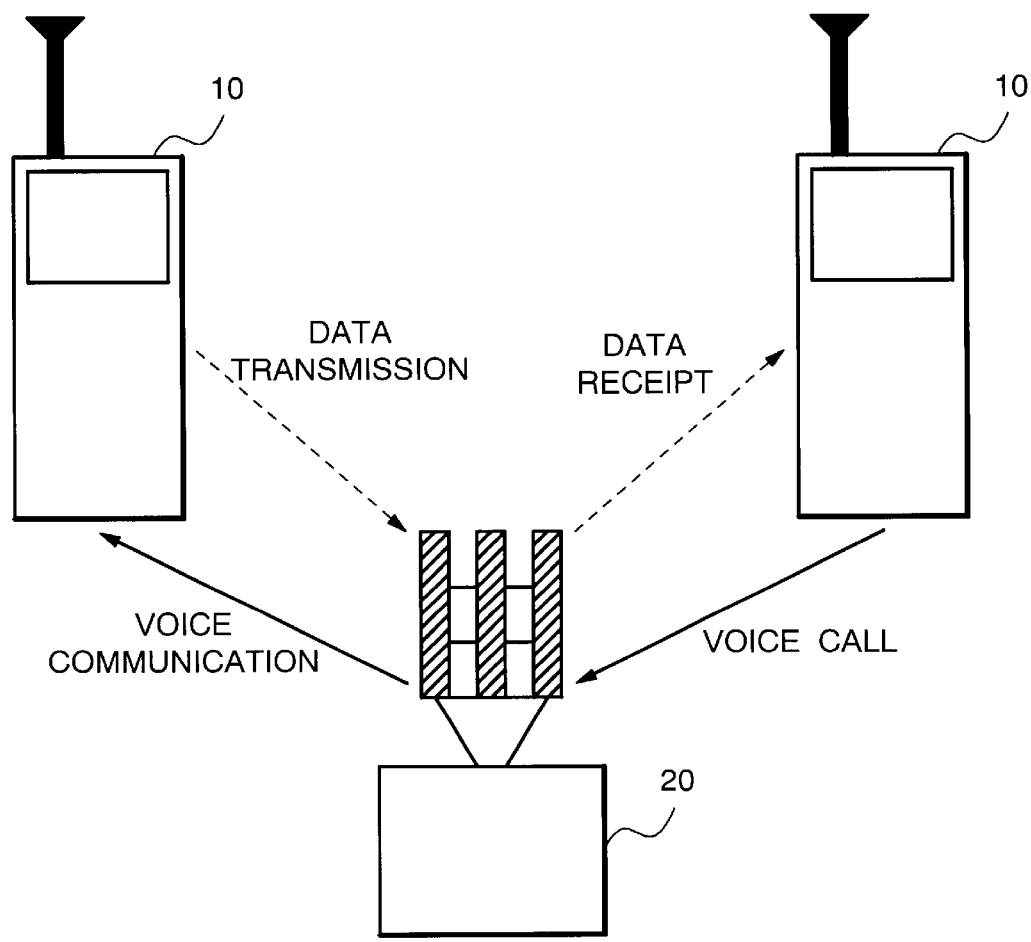
FIG. 1 is a block diagram showing the structure of a communication service system using a portable communication terminal according to an embodiment of the present invention.

FIG. 1 is a block diagram showing the structure of a communication service system using a portable communication terminal according to the form of the embodiment of the present invention. As illustrated, the system comprises a portable communication terminal 10 which is carried and used by a user for communication and a base station 20 providing a communication service by the portable communication terminal 10.

In FIG. 1, for the sake of brief description, although only two portable communication terminals 10 and one base station 20 are illustrated, actually there are a plurality of the terminals and the stations. The two portable communication terminals 10 have the identical structure and they are not distinguished in the later description in principle. Only in the case of needing to distinguish a calling party and a called party in the description about the communication operation, the portable communication terminal at a calling party is represented as the portable communication terminal 10a and that one at a called party is represented as the portable communication terminal 10b.

A plurality of the base stations 20 are mutually connected to each other, which enables communication between the portable communication terminals 10 existing without the range of one base station 20. More specifically, a predetermined portable communication terminal 10 is connected to a predetermined base station 20, and the other predetermined portable communication terminal 10 is connected to the other predetermined base station 20. Connection between the two base stations 20 enables communication between the two portable communication terminals 10 through the two base stations 20.

As illustrated in FIG. 1, there are voice communication and data communication in a communication method by the portable communication terminal 10 and the base station 20 for use in the form of the embodiment. Here, the voice communication function means the real time communication by a natural voice. The data communication function means the communication by use of a digital signal of no sound.

Figure 2:
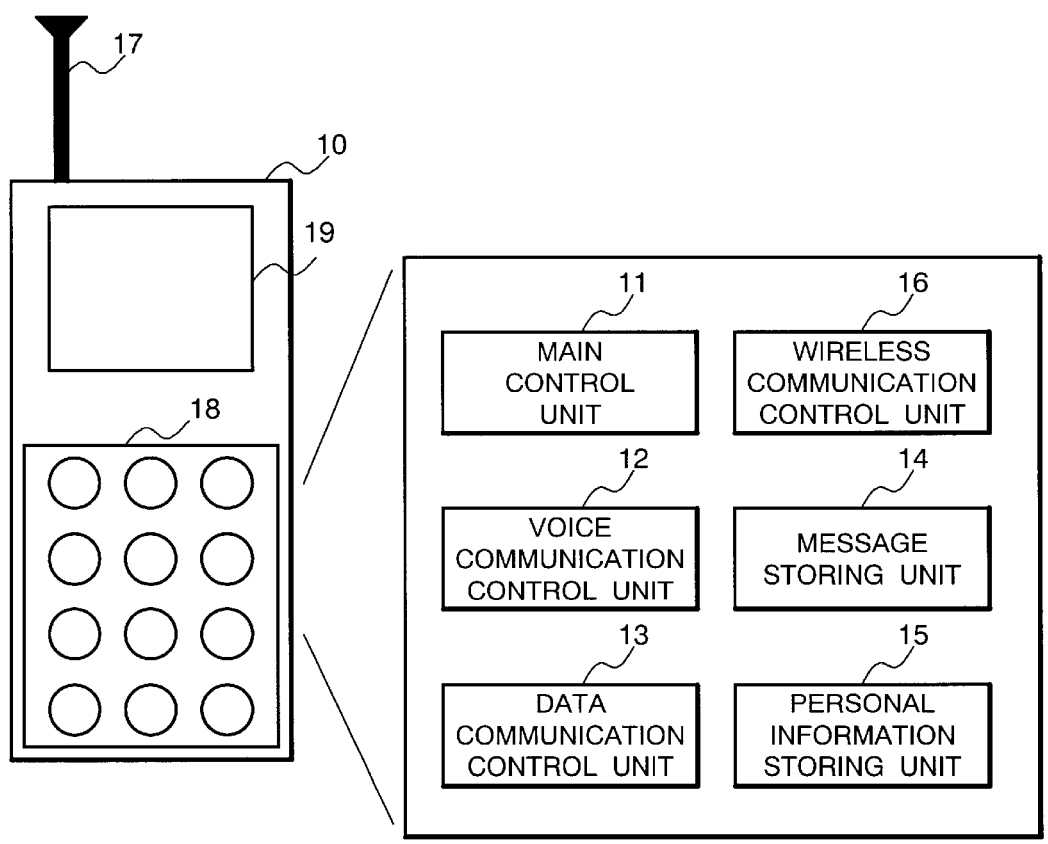
FIG. 2 is a block diagram showing the structure of a portable communication terminal according to the form of the embodiment of the present invention.

FIG. 2 is a block diagram showing the structure of the portable communication terminal 10 according to the form of the embodiment. With reference to FIG. 2, the portable communication terminal 10 of the form of the embodiment comprises a main control unit 11 for controlling the whole operation, a voice communication control unit 12 for providing a voice communication function, a data communication control unit 13 for providing a data communication function, a message storing unit 14 for storing a message of character data when a user cannot answer a call, a personal information storing unit 15 for registering or storing the personal information, a wireless communication control unit 16 for controlling wireless communication, an antenna 17, an operation unit 18 for entering data or command, and a display unit 19 for displaying each kind of information. Though it is not illustrated, needless to say, it further comprises the ordinary components for use in voice communication such as a microphone for entering sound and a speaker for supplying the voice.

The main control unit 11, upon receipt of the input by the operation unit 18, performs general communication processing such as connecting to the other portable communication terminal 10 and displaying the connection state on the display unit 19 and the like regardless of the voice communication or the data communication. Further, the processing for confirming registration information by checking the personal information and the arrival information described later is performed by a control of the main control unit 11.

The voice communication control unit 12 performs the processing necessary for realizing voice communication, such as encoding an input voice and decoding the received voice signal to supply a voice.

The data communication control unit 13 performs the processing necessary for realizing data communication, such as receiving the input by the operation of the operation unit 18 and displaying the received data on the display unit 19. An electronic mail including a message described later is sent according to a control of the data communication control unit 13.

The main control unit 11, the voice communication control unit 12 and the data communication control unit 13 are realized by, for example, a CPU controlled by a program. These units may be physically formed by the identical CPU.

The message storing unit 14 stores a message of character data which is to be sent to a calling party having issued a call to this terminal or another number established as a transfer destination associated with the calling party, under a predetermined condition. An electronic mail including a message is sent according to a control of the data communication control unit 13. A message of character data stored in the message storing unit 14 can be received, for example, by the data input operation using the operation unit 18. A plurality of messages of character data can be stored and the content of each message can be selected depending on the situation of a called party. A plurality of messages are stored together with the message number (type), for example, message 1: "I'm occupied, so I'll call you later.", message 2: "I cannot answer the phone because of moving.", message 3: "I'm at a conference.", and by specifying the message number, a desired message can be sent by the electronic mail. Namely, when the above messages 1, 2 and 3 are stored in the message storing unit 14 and it is arranged in that the message 2 will be returned at a time of driving a car, even if a call arrives during driving and a user cannot operate the portable communication terminal 10, the portable communication terminal having received the call automatically works to send the message 2 of character data to a calling party by an electronic mail after the calling party cuts it off.

The personal information storing unit 15 stores the information relative to a destination party to send a message of character data stored in the message storing unit 14. FIG. 3 shows an example of the personal information. With reference to FIG. 3, the personal information includes the ID information of a user to be registered (registration name), the phone number of the user, the electronic mail address, the transfer destination address for transfer and the message type (message number).

The message storing unit 14 and the personal information storing unit 15 may be realized by, for example, a RAM or the other internal memory. They may be physically constituted by the identical memory.

The wireless communication control unit 16 sends and receives radio waves between the base station 20 and itself through the antenna 17, and further encodes the transmission waves and decodes the received waves.

The operation unit 18 is provided with numerical keys and special command keys, which are used for dialing to a communication party, entering data, switching mode and the like.

The display unit 19 may be realized by, for example, a liquid crystal display, and it informs a user about the connection state to the other portable communication terminal 10 and the base station 20 and displays the data (text data, etc.) received by the data communication function.

Figure 4:
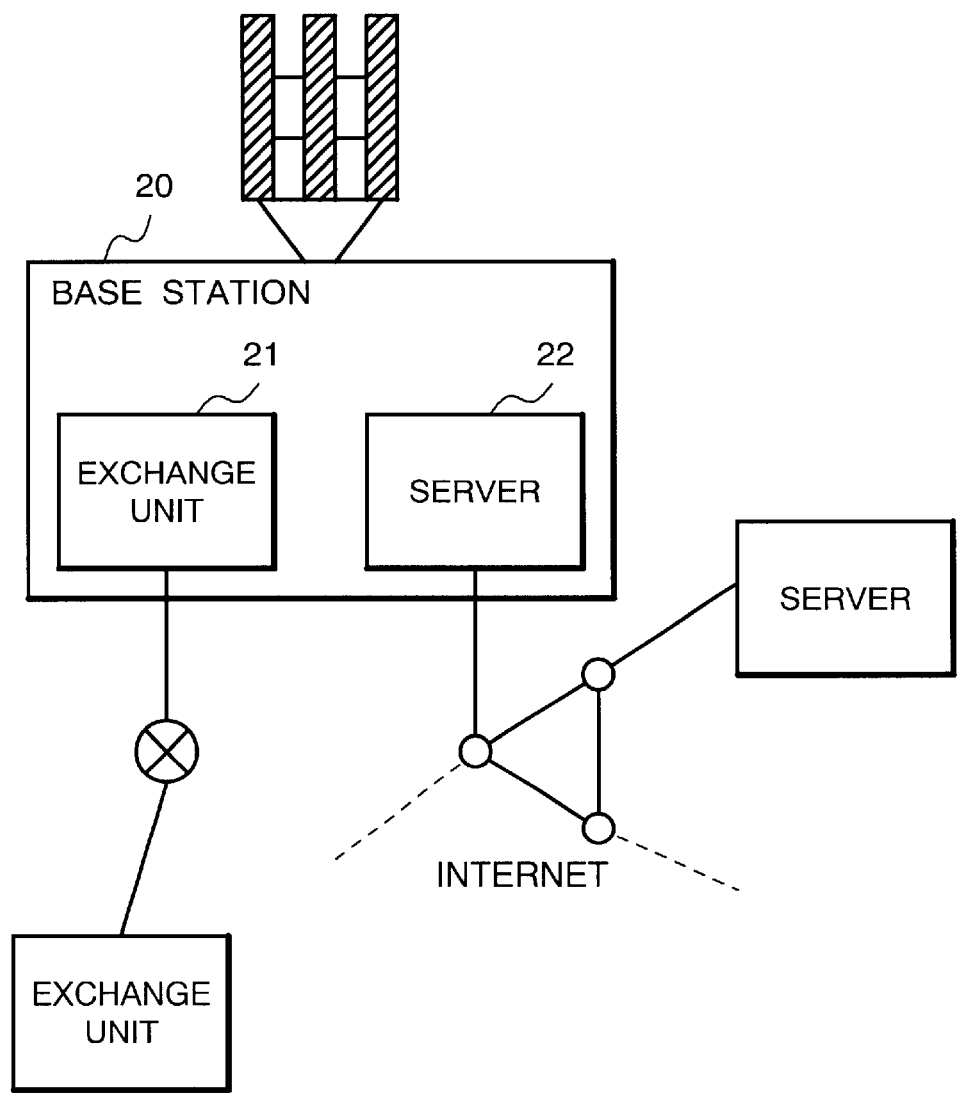
FIG. 4 is a block diagram showing the structure of a base station according to the form of the embodiment.

FIG. 4 is a view showing the structure of the base station 20. With reference to FIG. 4, the base station 20 comprises an exchange unit 21 for controlling a line in the voice communication and a server 22 for controlling communication in the data communication. The server 22 receives and stores the data sent from the portable communication terminal 10, and it sends the data to a portable communication terminal 10 that is the destination of the same data. The portable communication terminal 10 can gain access to the server 22 to ask for the data destined for itself and obtain the same data from the stored data. As illustrated in FIG. 4, the server 22 is connected to the other server 22 through a network such as the Internet. Therefore, when the portable communication terminal 10 that is the destination party of the stored data exists without the range capable of wireless communication in the present base station 20, the same data can be sent to the portable communication terminal 10 through the other base station 20 capable of wireless communication with the same portable communication terminal 10.

This time, the operation according to the form of the embodiment will be described.

The operation will be described assuming that a call for voice communication is issued from the portable communication terminal 10a to the portable communication terminal 10b and that a user of the portable communication terminal 10b at a called party is not in a state capable of voice communication. In this case, as the initial setting, the portable communication terminal 10b is set at a mode of sending a message by the electronic mail in reply to a call. Predetermined messages depending on the respective situations are stored in the message storing unit 14 of the portable communication terminal 10b and the personal information as illustrated in FIG. 3 is stored in the personal information storing unit 15.

Figure 5:
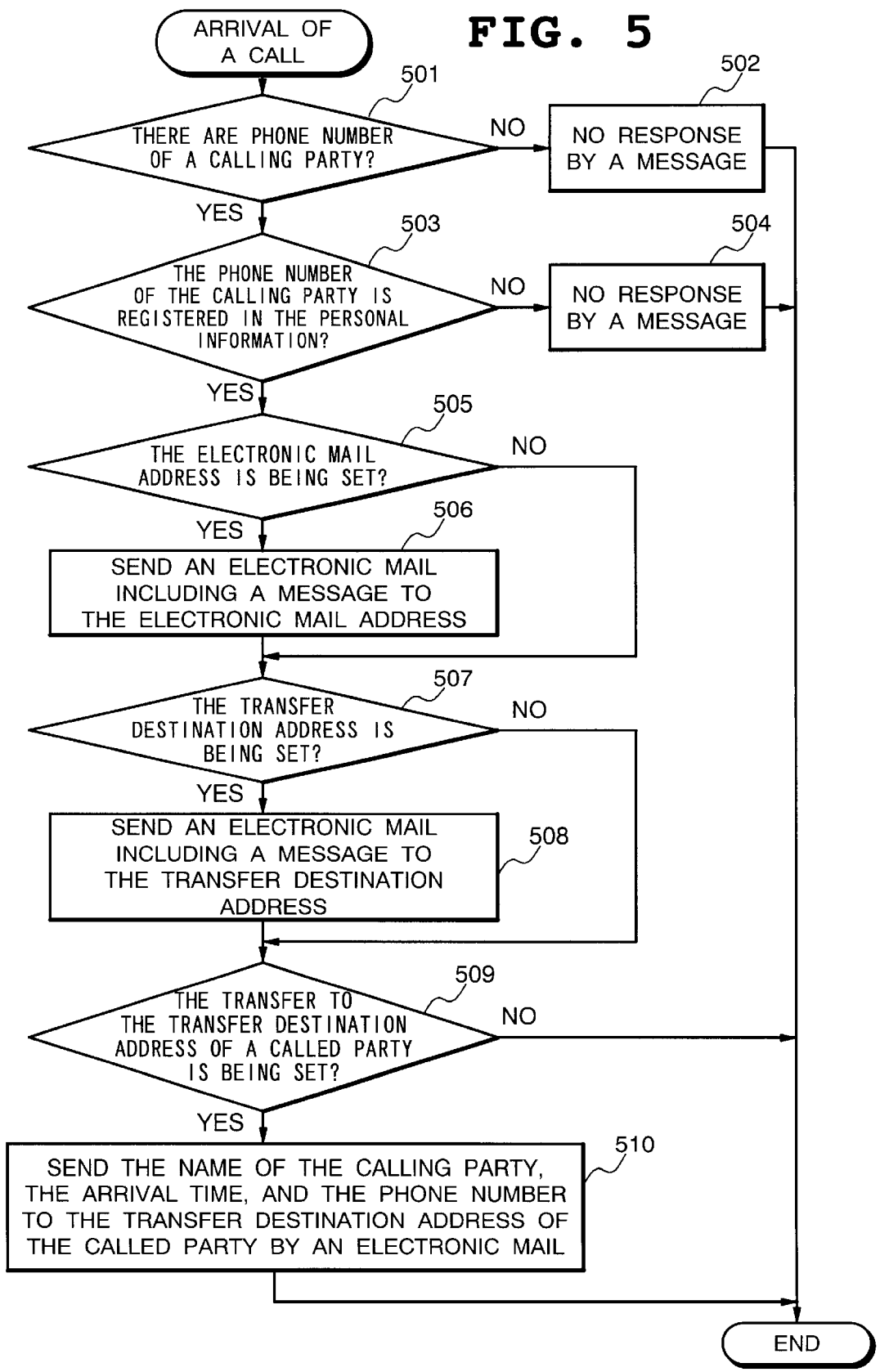
FIG. 5 is a flow chart showing the operation at the arrival of a call according to the form of the embodiment.

The operation of the portable communication terminal 10b at a called party will be described with reference to the flow chart of FIG. 5. When receiving a call, a user of the terminal is absent or not in a position to answer, and when the call from a calling party is cut off, the portable communication terminal 10b having received the call first confirms whether the number of the calling party (the phone number of the portable communication terminal 10a on the calling party) is attached to the arrival information, according to a control of the main control unit 11 (Step 501). When no phone number is attached, the processing will be finished without returning any message by the electronic mail (Step 502).

If the phone number is attached to the arrival information, whether the phone number of the calling party is registered in the personal information within the terminal or not is checked according to a control of the main control unit 11 (Step 503). When no phone number is registered, the processing will be finished without returning any message by the electronic mail (Step 504).

When the phone number attached to the arrival information is registered in the personal information, whether the electronic mail address is set in the checked personal information or not is confirmed according to a control of the main control unit 11 (Step 505). When the electronic mail address is registered, the electronic mail including a message of character data stored in the message storing unit 14 is sent to the specified electronic mail address (Step 506). The message to be sent at this time is selected depending on the state of a user of the portable communication terminal 10b.

When no electronic mail address of the calling party is registered in Step 505, whether the transfer destination address of the calling party is registered or not is confirmed (Step 507).

When the transfer destination address is registered, the electronic mail including a message of character data stored in the message storing unit 14 is sent to the specified transfer destination address (Step 508). The message to be sent at this time is selected depending on the state of a user of the portable communication terminal 10b.

Further, whether the transfer to the transfer destination address of a called party (a user of the portable communication terminal 10b) is being set or not is confirmed (Step 509).

When the transfer is being set, the information including the arrival time of a call from a calling party, the registered name of the calling party retrieved from the personal information and the phone number of the calling party at the arrival time of a voice call is added to the arrival information, so to be sent to the mail address of the transfer destination of a called party (Step 510). Thus, the information including the arrival time of a call from a calling party, the registered name of the calling party retrieved from the personal information and the phone number of the calling party at the arrival time of a voice call is sent to the transfer destination address of a called party by the electronic mail, thereby enabling a user of the terminal to receive the above transfer mail through a communication means other than the portable communication terminal and confirm the arrival of the call destined for the user himself or herself. For example, the arrival of a call can be confirmed by a personal computer within an office or the like.

More concretely, in case of receiving a call signal from the portable communication terminal 10a of the registered name "Shibuya", when the phone number of a calling party is added to the arrival information (refer to Step 501), the corresponding record is within the personal information (refer to Step 503) and only the electronic mail address is registered. Accordingly, the electronic mail including a message of character data is sent only to the corresponding electronic mail address shibuya@mail (refer to Steps 505 and 506).

In case of receiving a call signal from the portable communication terminal 10a of the registered name "Harajuku", when the phone number of a calling party is added to the arrival information (refer to Step 501), the corresponding record is within the personal information (refer to Step 503) and both the electronic mail address and the transfer destination address are registered. Accordingly, the electronic mail including a message is sent to both the electronic mail address "hara@mail" and the transfer destination address "fwd@mail" (refer to Steps 505 to 508).

Hereinabove, although the present invention has been described while taking an example of the form of the preferred embodiment, the present invention is not restricted to the above form of the embodiment. For example, although in the form of the embodiment, the description has been made in the case of sending a predetermined message of character data or electronic mail to a calling party when receiving a call in the voice communication, it is also possible to retrieve the personal information in case of receiving an electronic mail in the portable communication terminal 10b (data communication) and then automatically return or transfer the electronic mail from the terminal when the address of the calling party of this electronic mail is in accord with the electronic mail address registered in the personal information and a return or transfer is being set.

This can automatically return a mail in absence or transfer an electronic mail destined for a terminal to another communication device at the other site such as a company, and cope with a mischievous call effectively.

Further, a function of obtaining the positional information such as the GPS (Global Positioning System) can be provided in the portable communication terminal 10, thereby returning the positional information of the portable communication terminal 10 to a calling party by making a call or sending an electronic mail to the same portable communication terminal 10.

Further, a patient having a medical device can carry the portable communication terminal 10 with him or her, so as to connect the medical device to the portable communication terminal 10. If the portable communication terminal 10 is arranged to obtain the data of the medical device, by making a call or sending an electronic mail to the portable communication terminal 10, the data of the medical device can be transferred to the calling party at a remote site.

As set forth hereinabove, according to the portable communication terminal of the present invention and the communication service system using the same portable communication terminal, an electronic mail including a message of character data can be sent to the electronic mail address or the transfer destination address of the calling party when a user at a called party is not in a position to answer a call, thereby properly communicating one's situation to the other. Thus, a calling party can take proper measures according to the message of the electronic mail sent to the calling party.

Further, the electronic mail with the arrival time of a call from a calling party, the registered name of the calling party retrieved from the personal information and the phone number of the calling party at the arrival of the voice call added thereto can be transferred to the transfer destination address of a called party, thereby enabling a user of the terminal to confirm the arrival of a call for the user himself or herself, by receiving the above transfer mail through a communication means other than the portable communication terminal.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A portable communication terminal having voice communication control means for performing voice communication, and data communication control means for performing data communication, said terminal comprising:

message storing means for storing a plurality of messages according to various message types; and personal information storing means for storing a phone number of a calling party, an electronic mail address and a selected message type associated with each other, wherein, when answering a call is impossible, said data communication control means retrieves information stored in said personal information storing means by using the phone number of a calling party of said call and when stored phone number of said calling party is retrieved according to said retrieving step, said data communication control means sends an electronic mail, including the message corresponding to said selected message type stored in said message storing means.

2. A portable communication terminal as set forth in claim 1, wherein said information storing means stores said phone number of a calling party, said electronic mail address, a transfer destination address and said selected message type associated with each other, when answering a call is impossible, said data communication control means retrieves information stored in said personal information storing means by using the phone number of the calling party added to the arrival information as said key, and when the corresponding phone number of the calling party is detected, sends an electronic mail, including the message corresponding to said selected message type stored in said message storing means, to the electronic mail address, or to the transfer destination address associated with the same phone number, as a destination.

3. A portable communication terminal as set forth in claim 1 wherein said information storing means stores said phone number of a calling party, said electronic mail address, a transfer destination address and said selected message type associated with each other, when answering a call is impossible, said data communication control means retrieves information stored in said personal information storing means by using the phone number of the calling party added to the arrival information as a key, and when the corresponding phone number of the calling party is detected, sends an electronic mail, including the message corresponding to said selected message type stored in said message storing means, to at least one of the electronic mail address and the transfer destination address associated with the same phone number as a destination.

4. A portable communication terminal as set forth in claim 1, wherein said data communication control means sends the arrival information, including the phone number of a calling party and arrival time of a call, to the transfer destination address of called party, by an electronic mail, when transfer to the transfer destination address of the called party is being set.

5. A portable communication terminal as set forth in claim 1, wherein, when the phone number of a calling party is not added to arrival information, said data communication control means finishes processing without sending said electronic mail including the massage.

6. A portable communication terminal as set forth in claim 1 wherein, when the corresponding phone number is not detected, said data communication control means finishes processing without sending said electronic mail including the message.

7. An automatic answering method of a portable communication terminal having voice communication control means for performing voice communication, and data communication control means for performing data communication, said method comprising:

storing a plurality of messages according to various message types;

storing a phone number of a calling party, an electronic mail address and a selected message type associated with each other in a personal information storing means;

when answering a call is impossible, retrieving information stored in said personal information storing means by using the phone number of a calling party of said call; and when stored phone number of said calling party is retrieved according to said retrieving step, sending an electronic mail, including the message corresponding to said selected message type stored in said message storing means.

8. An automatic answering method as claimed in claim 7, further comprising storing a transfer destination address in said personal information storing means, when answering a call is impossible, retrieving information stored in said personal information storing means by using the phone number of the calling party added to the arrival information as a key, and when the corresponding phone number of the calling party is detected, sending an electronic mail, including the message corresponding to said selected message type stored in said message storing means, to the electronic mail address, or to the transfer destination address associated with the same phone number as a destination.

9. An automatic answering method as claimed in claim 7, further comprising storing a transfer destination address in said personal information storing means, when answering a call is impossible, retrieving information stored in said personal information storing means by using the phone number of the calling party added to the arrival information as a key, and when the corresponding phone number of the calling party is detected, sending an electronic mail, including the message corresponding to said selected message type stored in said message storing means, to at least one of the electronic mail address and the transfer destination address associated with the same phone number as a destination.

10. An automatic answering method as claimed in claim 7, further comprising sending the arrival information including the phone number of a calling party and arrival time of a call to the transfer destination address of a called party, by an electronic mail, when transfer to the transfer destination address of the called party is being set.

11. An automatic answering method as claimed in claim 7, further comprising, when the phone number of a calling party is not added to arrival information, finishing processing without sending said electronic mail including the message.

12. An automatic answering method as claimed in claim 7 further comprising, when the corresponding phone number is not detected, finishing processing without sending said electronic mail including the message.

* * * * *

UNITED STATES PATENT AND TRADEMARK OFFICE
CERTIFICATE OF CORRECTION

PATENT NO. : 6,847,703 B2
APPLICATION NO. : 09/745809
DATED : January 25, 2005
INVENTOR(S) : Atsushi Shibuya It is certified that error appears in the above-identified patent and that said Letters Patent is hereby corrected as shown below:

Col. 6, line 33 delete "unnecessary", insert --unnecessarily--.

Col. 11, line 15 delete "embodies" insert --embodied--.

Col. 11, lines 47 & 48 (claim 2) delete "added to the arrival information as a key" insert --of said call--.

Col. 11, lines 49 & 50 (claim 2) delete "when the corresponding phone number of the calling party is detected" insert --when stored phone number of said calling party is retrieved according to said retrieval step--.

Col. 11, lines 66 & 67 (claim 3) delete "added to the arrival information as a key" insert --of said call--.

Col. 12, lines 1 & 2 (claim 3) delete "when the corresponding phone number of the calling party is detected" insert --when stored phone number of said calling party is retrieved according to said retrieval step--.

Col. 12, line 4 (claim 7) after "when" insert --the--.

Col. 12, line 18 (claim 5) delete "massage", insert --message--.

Col. 12, line 51 (claim 8) delete "added to the arrival information as a key" insert --of said call--.

Col. 12, line 52 (claim 8) delete "the corresponding phone number of the calling party is detected" insert --the stored phone number of said calling is retrieved according to said retrieval step--.

Col. 12, lines 64 & 65 (claim 9) delete "added to the arrival information as a key" insert --of said call--.

UNITED STATES PATENT AND TRADEMARK OFFICE
CERTIFICATE OF CORRECTION

| | |
|---|---|
| PATENT NO. | : 6,847,703 B2 |
| APPLICATION NO. | : 09/745809 |
| DATED | : January 25, 2005 |
| INVENTOR(S) | : Atsushi Shibuya |

It is certified that error appears in the above-identified patent and that said Letters Patent is hereby corrected as shown below:

Col. 12, lines 66 & 67 (claim 9) delete "the corresponding phone number of the calling party is detected" insert --the stored phone number of said calling party is retrieved according to said retrieval step--.

Signed and Sealed this

Eighth Day of July, 2008

JON W. DUDAS
*Director of the United States Patent and Trademark Office*